United States Patent
Sethi et al.

(10) Patent No.: US 11,061,782 B2
(45) Date of Patent: Jul. 13, 2021

(54) SYSTEM AND METHOD FOR PRIORITIZED PROCESSING OF ALERTS FROM INFORMATION HANDLING SYSTEMS

(71) Applicant: DELL PRODUCTS, LP, Round Rock, TX (US)

(72) Inventors: Parminder Singh Sethi, Ludhian (IN); Ravikanth Chaganti, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 54 days.

(21) Appl. No.: 16/685,799

(22) Filed: Nov. 15, 2019

(65) Prior Publication Data

US 2021/0149776 A1 May 20, 2021

(51) Int. Cl.
*G06F 11/07* (2006.01)
*G06F 11/16* (2006.01)
*H04L 12/24* (2006.01)
*G06F 11/18* (2006.01)
*G06Q 10/00* (2012.01)

(52) U.S. Cl.
CPC ........ *G06F 11/1658* (2013.01); *G06F 11/181* (2013.01); *G06Q 10/20* (2013.01); *H04L 41/5019* (2013.01)

(58) Field of Classification Search
CPC ............. G06F 11/1658; G06F 11/1666; G06F 11/181; G06F 11/2023; G06F 11/2028; G06F 11/2033; G06F 11/2041; H04L 41/5019

USPC ......... 714/2, 4.11, 5.1, 6.2, 6.3, 6.32, 12, 13
See application file for complete search history.

(56) References Cited

U.S. PATENT DOCUMENTS

| | | | |
|---|---|---|---|
| 7,580,994 B1* | 8/2009 | Fiszman | H04L 41/0654 709/223 |
| 2012/0041858 A1 | 2/2012 | Lewis | |
| 2015/0347951 A1 | 12/2015 | Tamblyn et al. | |
| 2016/0092322 A1* | 3/2016 | Nosov | H04L 41/0663 714/4.11 |
| 2016/0378603 A1 | 12/2016 | Herzi et al. | |
| 2018/0034720 A1 | 2/2018 | Bell et al. | |
| 2019/0104649 A1 | 4/2019 | Clidaras et al. | |
| 2019/0138287 A1 | 5/2019 | De Capoa et al. | |
| 2019/0155712 A1* | 5/2019 | Tiwari | G06F 11/3006 |
| 2020/0151079 A1* | 5/2020 | Tiwari | G06F 11/3006 |

* cited by examiner

Primary Examiner — Chae M Ko
(74) Attorney, Agent, or Firm — Larson Newman, LLP

(57) ABSTRACT

A system receives a first alert pertaining to a main part from a managed information handling system, determines whether an alternative part is available at the managed information handling system as a substitute for the main part, and determines a life expectancy of the alternative part. The system may also determine whether an expected level of service can be expected to be provided by the alternative part based on the life expectancy of the alternative part, select between a plurality of levels of criticality to apply to the first alert, and dispatch the first alert for resolution at a selected level of criticality.

20 Claims, 3 Drawing Sheets

SYSTEM AND METHOD FOR PRIORITIZED PROCESSING OF ALERTS FROM INFORMATION HANDLING SYSTEMS

FIELD OF THE DISCLOSURE

The present disclosure generally relates to information handling systems, and more particularly relates to prioritized processing of alerts from information handling systems.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A system may receive a first alert pertaining to a main part from a managed information handling system, determine whether an alternative part is available at the managed information handling system as a substitute for the main part, and determine a life expectancy of the alternative part. The system may also determine whether an expected level of service can be expected to be provided by the alternative part based on the life expectancy of the alternative part, select between levels of criticality to apply to the first alert, and dispatch the first alert for resolution at a selected level of criticality.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
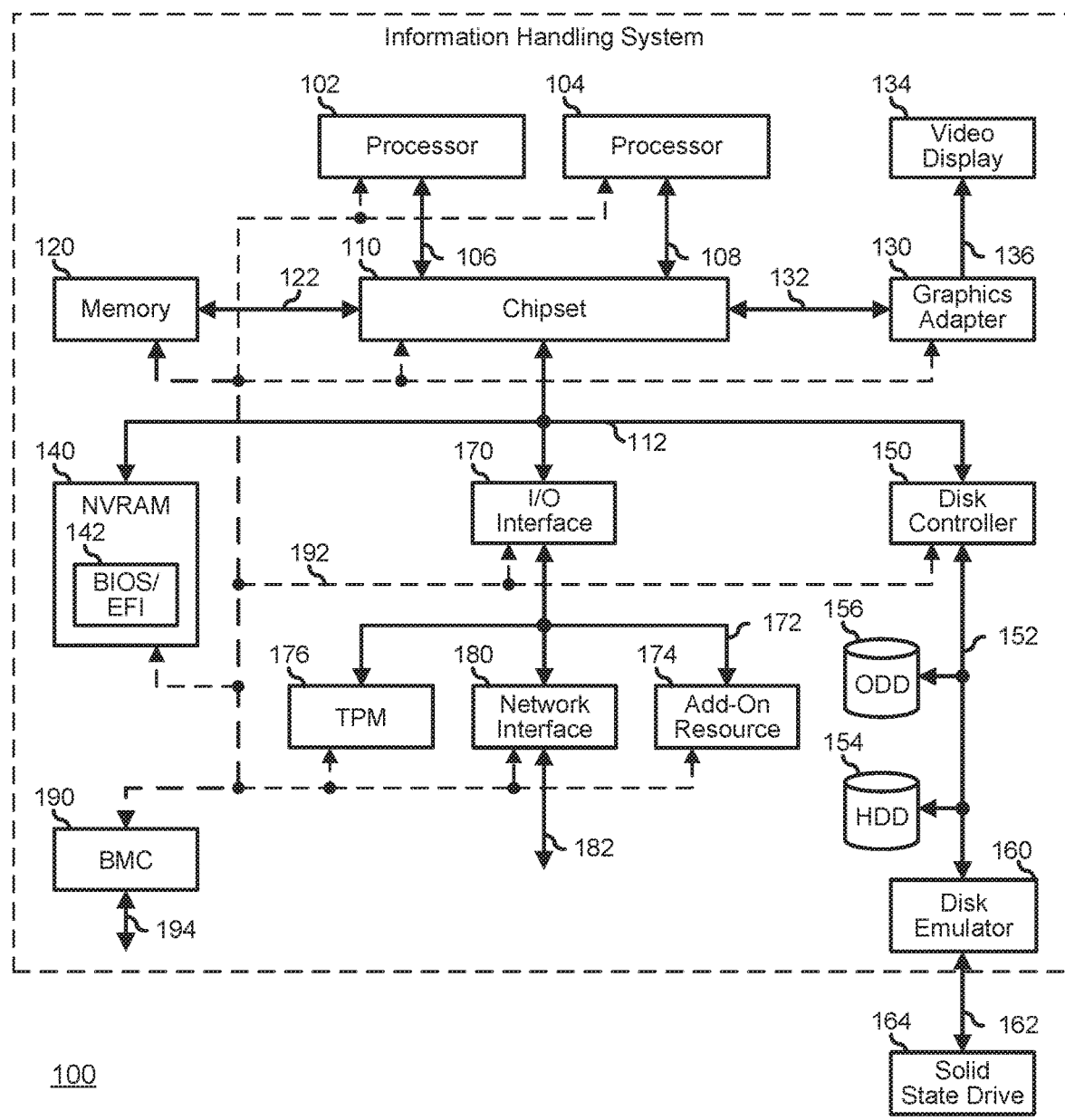
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics adapter 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics adapter 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a Serial Peripheral Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

BMC 190 is connected by a management interface 192 to a plurality of system components, such as processor 102, processor 104, memory 120, chipset 110, graphics adapter 130, I/O interface 170, disk controller 150, NVRAM module 140, TPM 176, network interface 180, and add-on resource 174. BMC 190 is connected to an external management interface 194 for platform management by an external IHS.

Figure 2:
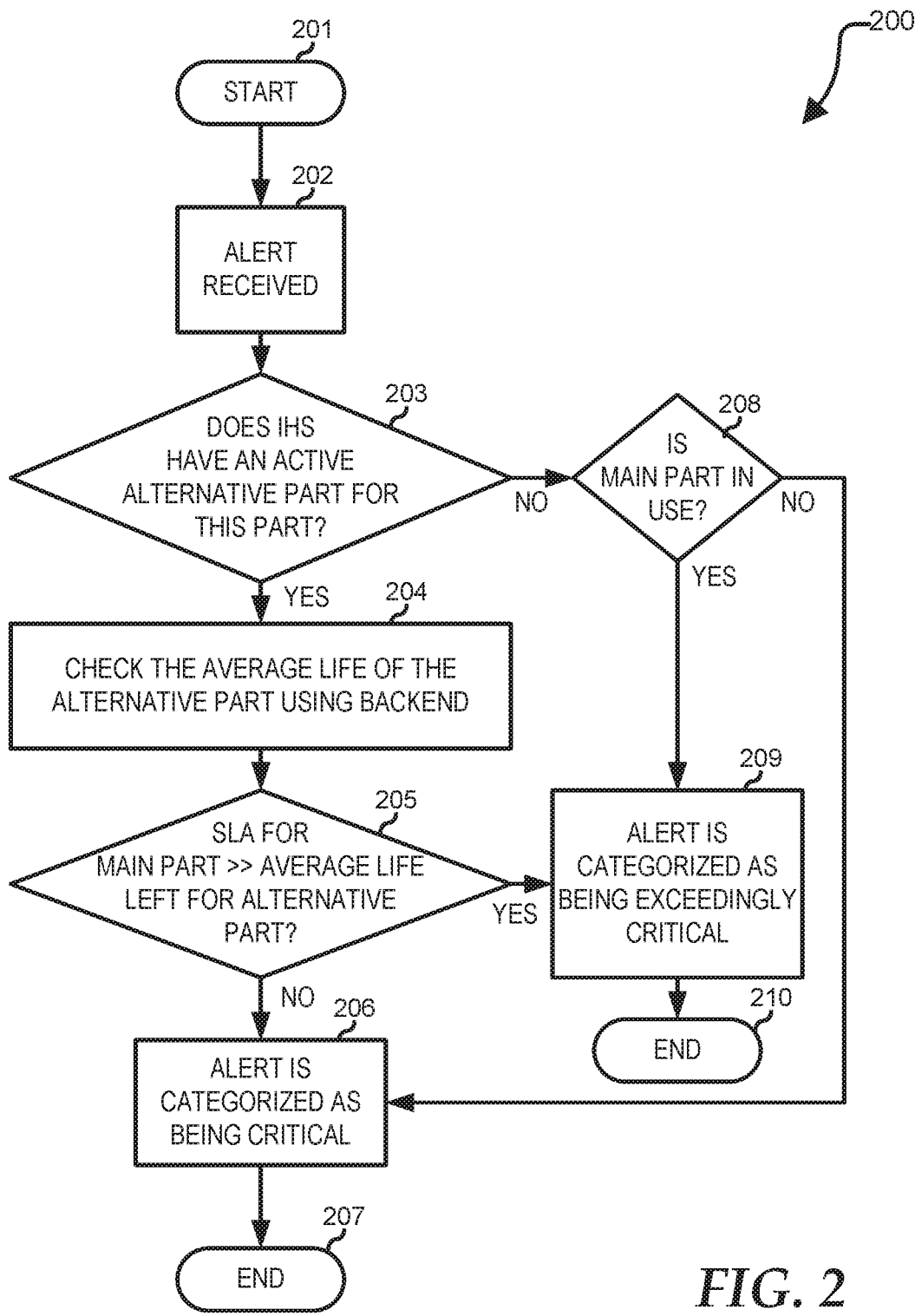
FIG. 2 is a flow diagram illustrating a method for processing alerts received from an information handling system according to an embodiment of the present disclosure.

FIG. 2 shows a method for processing alerts received from an information handling system according to an embodiment of the present disclosure. Method 200 begins at block 201 and continues to block 202. At block 202, an alert is generated at an information handling system being managed. The alert is transmitted to a system management server (e.g., an information handling system performing the management of the other information handling system). The system management server receives the alert. The alert can be in the form of a system alert from the IHS or a trouble ticket generated for trouble indicated in the IHS. From block 202, method 200 continues to decision block 203. At decision block 203, a decision is made as to whether or not the information handling system being managed as an active alternative for a part for which the alert was generated. If not, method 200 continues to decision block 208. If so, method 200 continues to block 204. At block 204, a life expectancy of the alternative part is determined. For example, an average life of the alternative part can be checked using a backend server, and the expected remaining life of the alternative part can be determined.

From block 204, method 200 continues to decision block 205. At decision block 205, a service level agreement (SLA) can be analyzed with respect to the life expectancy of the alternative part. For example, if a level of service to be provided under the SLA with respect to the main part in need of replacement is greater than the level of service expected to be provided by the alternative part based on the life expectancy analysis of the alternative part, method 200 continues to block 209. If not, method 200 continues to block 206. In block 206, the received alert is categorized as being a critical alert. From block 206, method 200 continues to block 207, where it ends. If, at decision block 203, the decision was made that the IHS generating the alert does not have an active alternative part for the main part for which the alert was generated, method 200 continues to decision block 208.

At decision block 208, a decision is made as to whether or not the main part is in use. If not, method 200 continues to block 206, where the received alert is categorized as being a critical alert. From block 206, method 200 continues to block 207, where it ends. If, however, at decision block 208, the decision was made that the main part for which the alert was generated is in use, method 200 continues to block 209. At block 209, the alert is categorized as being exceedingly critical. From block 209, method 200 continues to block 210, where it ends.

Figure 3:
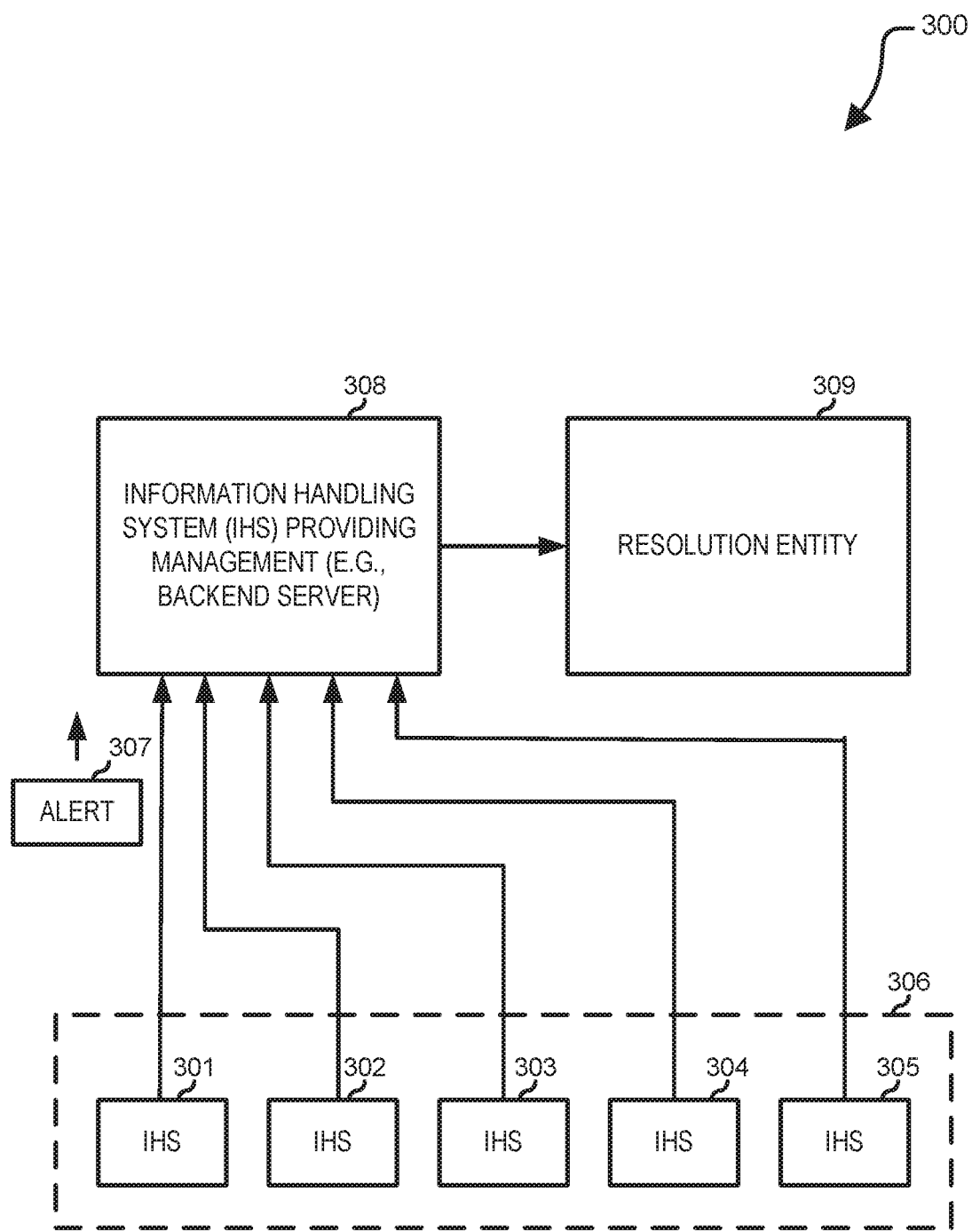
FIG. 3 is a block diagram illustrating a system including information handling systems being managed, an information handling system providing management, and a resolution entity according to an embodiment of the present disclosure.

FIG. 3 shows a system 300 including an information handling system 308 providing management of information handling systems 301, 302, 303, 304, and 305, and resolution entity 309. Information handling systems 301, 302, 303, 304, and 305 may be located, for example, at data center 306. Information handling system 308 may also manage other information handling systems, for example, information handling systems not located at data center 306. At least one of information handling systems 301, 302, 303, 304, and 305 generates and transmits alerts as the status of its components, such as indications of failure or impending failure of a component, to information handling system 308, which receives the alerts. Information handling system 308 processes and prioritizes the alerts, as described herein, and dispatches the prioritized alerts to resolution entity 309 for resolution of the prioritized alerts.

Within the enterprise data centers, the infrastructure typically includes server, storage, and network hardware. These components are usually monitored by system management software applications, which provide alerts that can arise due to malfunctioning or faulty components. Many of these management and monitoring tools are designed to proactively determine failures and to notify vendor support systems of component failures by creating technical support cases. This can be done by forwarding generated alerts to an information handling system, such as a support backend server, where a support case or dispatch is created based on the support entitlement, as may be determined by a service level agreement (SLA).

However, there may be alerts for different components either from the same system or the same data center at the same time. In such a scenario, when the alerts are not comparable, the standard procedures in filtering these alerts and creating technical support cases or dispatches may not be completely accurate and efficient. For example, there may be several alerts from a data center per day for the devices at that data center, which might be, for example, approximately 100-150 devices. This usually translates to several queries at the backend server, and alerts that reach the backend server may be unique, with similar alerts being merged into one. There can be alerts generated for components, such as fans and hard disk drives (HDDs), resulting in alerts being sent to the backend server. Such alerts can result in a replacement part dispatch to be triggered. However, in the past, prioritization of the resolution based on the component priority and alert severity was not provided, especially in the case of incomparable alerts. Incomparable alerts are alerts from diverse types of components. The diversity of component types prevents the respective severity levels of the incomparable alerts from being compared on a like-type basis. For example, if two hard disk drives (HDDs) were to send one alert each, the similarity of the component type (both components being HDDs) results in the alerts being comparable. However, as another example, if one alert were from a HDD and another of the same severity level were from a fan, the difference of component types (HDD vs. fan) makes the alerts incomparable. With the two incomparable alerts being of the same severity level, prioritization of one incomparable alert over the other has not heretofore been provided. Without prioritization of such incidents, replacement parts might be dispatched in cases where they were not immediately needed, while urgently needed replacement parts might not be dispatched in a timely manner consistent with the urgency.

In accordance with at least one embodiment, a system and method are provided to intelligently check the severity of non-comparable alerts based on different SLA entitlements. In accordance with at least one embodiment, an intelligent real-time alert assessment and helps in making the decisions based on the severity of incomparable alerts. An alert analysis can be performed based on real-time data collected from one or more information handling systems, for example, through a system management software application. The alert analysis can be performed based on a customer's environment and workload SLAs, for example, according to one or more specified levels of service to be provided.

Initially, an alert is received at a backend server, wherein the alert pertains to a component of an information handling system. The backend server first determines whether there exists in the information handling system an active alternate part for the part for which the alert has been generated. If an alternate part exists in the information handling system, a life expectancy of the alternative part is calculated using the customer environmental data available at the backend server. If a SLA pertaining to the part for which the alerts was generated is provides for a higher level of service than the alternate part is expected to be able to provide based on its life expectancy, the alert is marked as being exceedingly critical. If not, the alert is marked as being critical. If there is no alternate part for the part for which the alert was generated, the alert is marked as exceedingly critical. Alerts that are marked as exceedingly critical are elevated in the support queue and are prioritized for any support cases and dispatches.

In accordance with at least one embodiment, prioritization among alerts can be provided based on availability of temporary solutions, such as use of an alternate part already available to the information handling system generating the alert. For example, even among a plurality of at-least-critical alerts received at a backend server, at least one embodiment can decide whether one alert is more critical than the other and determine which alert needs immediate action, causing that more immediate alert to be prioritized based on analysis. At least one embodiment can categorize received alerts into a first category for the exceedingly critical alerts and a second category for critical (but not exceedingly critical) alerts. In addition to categorizing the alerts, at least one embodiment can assign a specific priority for each alert received. The assigned categories and priorities can be used to dispatch the alerts for resolution in a prioritized manner. The categorizations and prioritizations of previously received alerts can be updated, if appropriate, when a new alert is received.

In accordance with at least one embodiment, severity between two or more non-comparable alerts can be determined. In accordance with at least one embodiment, the alerts can be prioritized after a severity analysis check is performed. Real time impact assessment of alerts coming from any device can be provided. A solution can be provided that is independent of a manufacturer of the devices for which the alerts are generated and the type of the devices for which the alerts are generated. By determining availability of temporary solutions and the durations over which they can be expected to continue to exist, not only can failure prediction be provided but also a product to implement a long-term solution can be provided before profound failure in absence of mitigation using temporary solutions can occur.

In accordance with at least one embodiment, a method comprises receiving, at a managing information handling system (IHS), a first alert pertaining to a main part from a managed IHS; determining, at the managing IHS, whether an alternative part is available at the managed IHS as a substitute for the main part; determining, at the managing IHS, a life expectancy of the alternative part; determining, at the managing IHS, whether an expected level of service can be expected to be provided by the alternative part based on the life expectancy of the alternative part; selecting, at the managing IHS, between a plurality of levels of criticality to apply to the first alert; and dispatching, at the managing IHS, the first alert for resolution at a selected level of criticality, the plurality of levels of criticality comprising the selected level of criticality. In accordance with at least one embodiment, the method further comprises determining whether the main part is in use. In accordance with at least one embodiment, a higher level of criticality is selected in a first case where no alternative part is available at the managed IHS and the main part is in use and in a second case where the alternative part is available at the managed IHS but the life expectancy of the alternative part indicates the expected level of service cannot be expected to be provided by the alternative part. In accordance with at least one embodiment, a lower level of criticality is selected in a third case where no alternative part is available at the managed IHS and main part is not in use and in a fourth case where an active part is available at the managed IHS and the life expectancy of the alternative part indicates the expected level of service can be expected to be provided by the alternative part. In accordance with at least one embodiment, the life expectancy of the alternative part is determined by determining an average life of the alternative part and determining a remaining life of the alternative part based on the average life of the alternative part. In accordance with at least one embodiment, the method further comprises determining an expected delivery time of a replacement part, wherein the determining whether the expected level of service can be expected to be provided by the alternative part based on the life expectancy of the alternative part is performed with respect to the expected delivery time of the replacement part. In accordance with at least one embodiment, the expected level of service is determined from a service level agreement (SLA).

In accordance with at least one embodiment, an information handling system (IHS) comprises memory and a processor, the processor coupled to the memory, the processor configured to receive a first alert pertaining to a main part from a managed information handling system (IHS), to determine whether an alternative part is available at the managed IHS as a substitute for the main part, to determine a life expectancy of the alternative part, to determine whether an expected level of service can be expected to be provided by the alternative part based on the life expectancy of the alternative part, to select between a plurality of levels of criticality to apply to the first alert, and to dispatch the first alert for resolution at a selected level of criticality, the plurality of levels of criticality comprising the selected level of criticality. In accordance with at least one embodiment, the processor is further configured to determine whether the main part is in use. In accordance with at least one embodiment, a higher level of criticality is selected in a first case where no alternative part is available at the managed IHS and the main part is in use and in a second case where the alternative part is available at the managed IHS but the life expectancy of the alternative part indicates the expected level of service cannot be expected to be provided by the alternative part. In accordance with at least one embodiment, a lower level of criticality is selected in a third case where no alternative part is available at the managed IHS and main part is not in use and in a fourth case where an active part is available at the managed IHS and the life expectancy of the alternative part indicates the expected level of service can be expected to be provided by the alternative part. In accordance with at least one embodiment, the life expectancy of the alternative part is determined by determining an average life of the alternative part and determining a remaining life of the alternative part based on the average life of the alternative part. In accordance with at least one embodiment, the processor is further configured to determine an expected delivery time of a replacement part, wherein the determining whether the expected level of service can be expected to be provided by the alternative part based on the life expectancy of the alternative part is performed with respect to the expected delivery time of the replacement part. In accordance with at least one embodiment, the expected level of service is determined from a service level agreement (SLA).

In accordance with at least one embodiment, a method comprises receiving, at a managing information handling system (IHS), a first alert pertaining to a first main part from a first managed IHS; receiving, at the managing information handling system (IHS), a second alert pertaining to a second main part from a second managed IHS; receiving, at the managing information handling system (IHS), a third alert pertaining to a third main part from a third managed IHS; receiving, at the managing information handling system (IHS), a fourth alert pertaining to a fourth main part from a fourth managed IHS; determining, at the managing IHS, a first alternative part is available at the first managed IHS as a substitute for the first main part and a first expected level of service can be expected to be provided by the first alternative part based on a first life expectancy of the first alternative part and dispatching the first alert for resolution at a critical level of priority; determining, at the managing IHS, a second alternative part is available at the second managed IHS as a substitute for the second main part and a second expected level of service cannot be expected to be provided by the second alternative part based on a second life expectancy of the second alternative part and dispatching the second alert for resolution at an exceedingly critical level of priority; determining, at the managing IHS, an first alternate part unavailability at the third managed IHS as a substitute for the third main part and the third main part to be in use and dispatching the third alert for resolution at an exceedingly critical level of priority; and determining, at the managing IHS, a second alternative part unavailability at the fourth managed IHS as a substitute for the fourth main part and the fourth main part not to be in user and dispatching the fourth alert for resolution at a critical level of priority. In accordance with at least one embodiment, the first life expectancy of the first alternative part is determined by determining a first average life of the first alternative part and determining a first remaining life of the first alternative part based on the first average life of the first alternative part. In accordance with at least one embodiment, the method further comprises determining a first expected delivery time of a first replacement part, wherein the determining whether the first expected level of service can be expected to be provided by the first alternative part based on the first life expectancy of the first alternative part is performed with respect to the first expected delivery time of the first replacement part. In accordance with at least one embodiment, the expected level of service is determined from a service level agreement (SLA). In accordance with at least one embodiment, the first expected level of service, the second expected level of service, the third expected level of service, and the fourth expected level of service are different expected levels of service. In accordance with at least one embodiment, the first managed IHS, the second managed IHS, the third managed IHS, and the fourth managed IHS are located at a common data center.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
   receiving, at a managing information handling system (IHS), a first alert pertaining to a main part from a managed IHS;
   determining, at the managing IHS, whether an alternative part is available at the managed IHS as a substitute for the main part;
   determining, at the managing IHS, a life expectancy of the alternative part;
   determining, at the managing IHS, whether an expected level of service can be expected to be provided by the alternative part based on the life expectancy of the alternative part;
   selecting, at the managing IHS, between a plurality of levels of criticality to apply to the first alert; and
   dispatching, at the managing IHS, the first alert for resolution at a selected level of criticality, the plurality of levels of criticality comprising the selected level of criticality.

2. The method of claim 1 further comprising:
   determining whether the main part is in use.

3. The method of claim 2, wherein a higher level of criticality is selected in a first case where no alternative part is available at the managed IHS and the main part is in use and in a second case where the alternative part is available at the managed IHS but the life expectancy of the alternative part indicates the expected level of service cannot be expected to be provided by the alternative part.

4. The method of claim 2, wherein a lower level of criticality is selected in a third case where no alternative part is available at the managed IHS and main part is not in use and in a fourth case where an active part is available at the managed IHS and the life expectancy of the alternative part indicates the expected level of service can be expected to be provided by the alternative part.

5. The method of claim 1, wherein the life expectancy of the alternative part is determined by determining an average life of the alternative part and determining a remaining life of the alternative part based on the average life of the alternative part.

6. The method of claim 1 further comprising:
   determining an expected delivery time of a replacement part, wherein the determining whether the expected level of service can be expected to be provided by the alternative part based on the life expectancy of the alternative part is performed with respect to the expected delivery time of the replacement part.

7. The method of claim 1, wherein the expected level of service is determined from a service level agreement.

8. An information handling system (IHS) comprising:
   memory; and
   a processor coupled to the memory, the processor configured to receive a first alert pertaining to a main part from a managed IHS, to determine whether an alternative part is available at the managed IHS as a substitute for the main part, to determine a life expectancy of the alternative part, to determine whether an expected level of service can be expected to be provided by the alternative part based on the life expectancy of the alternative part, to select between a plurality of levels of criticality to apply to the first alert, and to dispatch the first alert for resolution at a selected level of criticality, the levels of criticality including the selected level of criticality.

9. The IHS of claim 8, wherein the processor is further configured to determine whether the main part is in use.

10. The IHS of claim 8, wherein a higher level of criticality is selected in a first case where no alternative part is available at the managed IHS and the main part is in use and in a second case where the alternative part is available at the managed IHS but the life expectancy of the alternative part indicates the expected level of service cannot be expected to be provided by the alternative part.

11. The IHS of claim 8, wherein a lower level of criticality is selected in a third case where no alternative part is available at the managed IHS and main part is not in use and in a fourth case where an active part is available at the managed IHS and the life expectancy of the alternative part indicates the expected level of service can be expected to be provided by the alternative part.

12. The IHS of claim 8, wherein the life expectancy of the alternative part is determined by determining an average life of the alternative part and determining a remaining life of the alternative part based on the average life of the alternative part.

13. The IHS of claim 8, wherein the processor is further configured to determine an expected delivery time of a replacement part, wherein the determining whether the expected level of service can be expected to be provided by the alternative part based on the life expectancy of the alternative part is performed with respect to the expected delivery time of the replacement part.

14. The IHS of claim 8, wherein the expected level of service is determined from a service level agreement.

15. A method comprising:
receiving, at a managing information handling system (IHS), a first alert pertaining to a first main part from a first managed IHS;
receiving, at the managing IHS, a second alert pertaining to a second main part from a second managed IHS;
receiving, at the managing information handling system (IHS), a third alert pertaining to a third main part from a third managed IHS;
receiving, at the managing information handling system (IHS), a fourth alert pertaining to a fourth main part from a fourth managed IHS;
determining, at the managing IHS, that a first alternative part is available at the first managed IHS as a substitute for the first main part and a first expected level of service can be expected to be provided by the first alternative part based on a first life expectancy of the first alternative part and dispatching the first alert for resolution at a critical level of priority;
determining, at the managing IHS, that a second alternative part is available at the second managed IHS as a substitute for the second main part and a second expected level of service cannot be expected to be provided by the second alternative part based on a second life expectancy of the second alternative part and dispatching the second alert for resolution at an exceedingly critical level of priority;
determining, at the managing IHS, a first alternate part unavailability at the third managed IHS as a substitute for the third main part and the third main part to be in use and dispatching the third alert for resolution at an exceedingly critical level of priority; and
determining, at the managing IHS, a second alternative part unavailability at the fourth managed IHS as a substitute for the fourth main part and the fourth main part not to be in use and dispatching the fourth alert for resolution at a critical level of priority.

16. The method of claim 15, wherein the first life expectancy of the first alternative part is determined by determining a first average life of the first alternative part and determining a first remaining life of the first alternative part based on the first average life of the first alternative part.

17. The method of claim 15 further comprising:
determining a first expected delivery time of a first replacement part, wherein the determining whether the first expected level of service can be expected to be provided by the first alternative part based on the first life expectancy of the first alternative part is performed with respect to the first expected delivery time of the first replacement part.

18. The method of claim 15, wherein the expected level of service is determined from a service level agreement (SLA).

19. The method of claim 15, wherein the first expected level of service, the second expected level of service, the third expected level of service, and the fourth expected level of service are different expected levels of service.

20. The method of claim 15, wherein the first managed IHS, the second managed IHS, the third managed IHS, and the fourth managed IHS are located at a common data center.

* * * * *